Figures 1, 2:
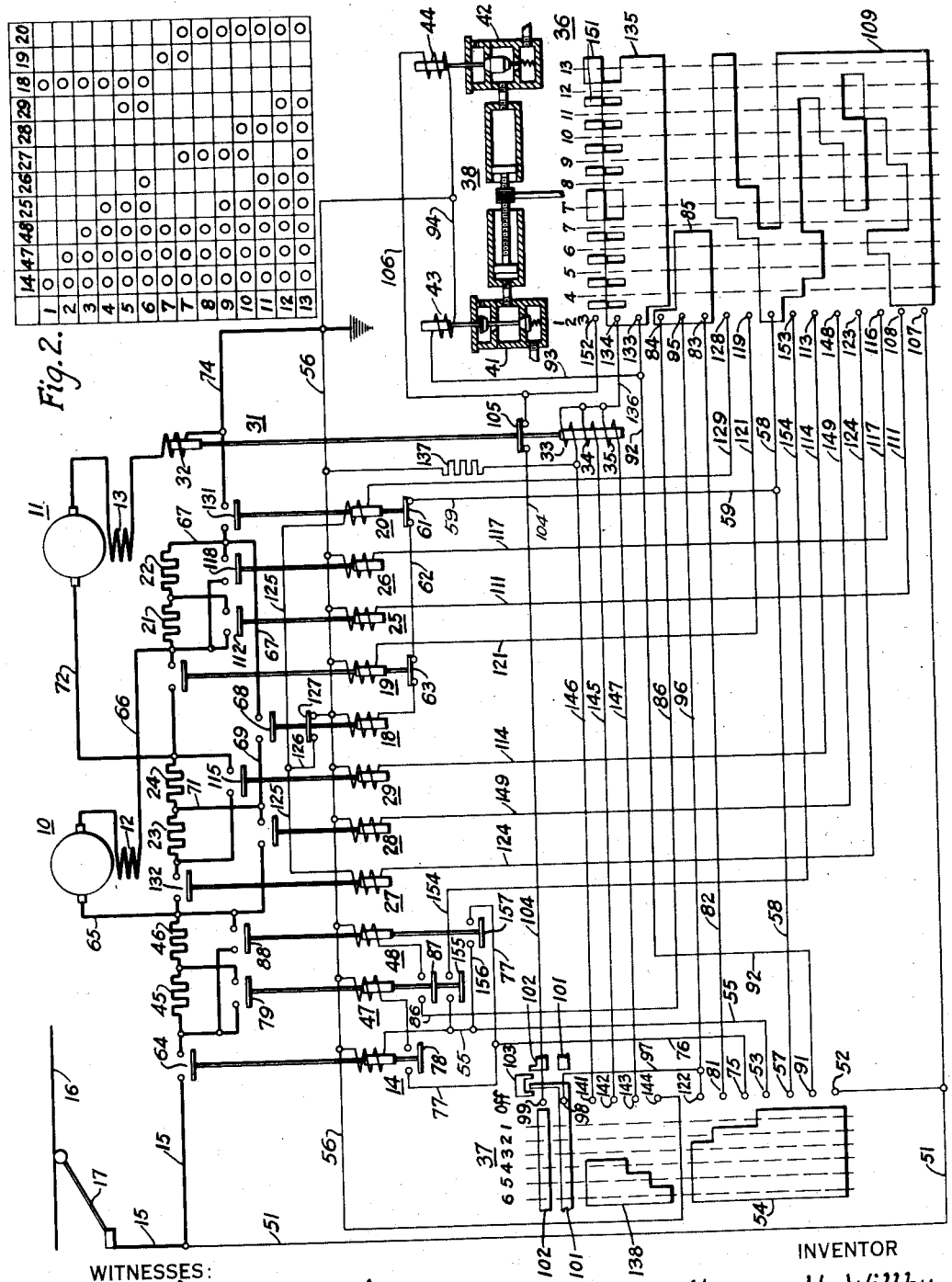

May 7, 1935.    N. H. WILLBY    2,000,727
MOTOR CONTROL SYSTEM
Filed June 21, 1933

WITNESSES:    INVENTOR
    Norman H. Willby.
    BY
    ATTORNEY

Patented May 7, 1935

2,000,727

UNITED STATES PATENT OFFICE 2,000,727

MOTOR CONTROL SYSTEM

Norman H. Willby, Wilkinsburg, Pa., assignor to Westinghouse Electric & Manufacturing Company, East Pittsburgh, Pa., a corporation of Pennsylvania Application June 21, 1933, Serial No. 676,845

10 Claims. (Cl. 172—179)

My invention relates, generally, to motor control systems, and, more particularly, to systems for controlling the acceleration of the propelling motors of electric vehicles.

The copending application of B. O. Austin, N. H. Willby and R. R. Brooks, Serial No. 491,956, filed October 29, 1930 and assigned to the Westinghouse Electric & Manufacturing Company describes and claims a system for automatically controlling the acceleration of an electric vehicle in which the rate of acceleration may be varied at the will of the operator to meet different operating conditions. The present application covers modifications and improvements of the system disclosed in the foregoing copending application.

An object of my invention, generally stated, is to provide a control system which shall be simple and efficient in operation and which may be economically manufactured and installed.

A more specific object of my invention is to provide for the smooth operation of an electric vehicle in order that a high degree of comfort for the passengers on the vehicle may be maintained.

Another object of my invention is to provide an automatic accelerating system in which the acceleration of the vehicle may be stopped when the master controller is in any position.

Other objects of the invention will be described fully hereinafter or will be apparent to those skilled in the art.

The invention, accordingly, is disclosed in the embodiment thereof shown in the accompanying drawing, and comprises the features of construction, combination of elements and arrangement of parts which will be exemplified in the construction hereinafter set forth and the scope of the application of which will be indicated in the claims.

For a fuller understanding of the nature and objects of the invention, reference may be had to the following detailed description, taken in conjunction with the accompanying drawing, in which:

Figure 1 is a diagrammatic view showing the apparatus and the circuits of a motor control system embodying my invention, and Fig. 2 is a chart showing the sequence of operation of a part of the apparatus shown in Fig. 1.

Referring to the drawing, the system shown comprises motors 10 and 11, which may be of a type suitable for propelling electric vehicles. The motors illustrated are of the series type, having series field windings 12 and 13 respectively. A line switch 14 is provided for connecting the motors to a power conductor 15, which is connected to a trolley conductor 16 by means of a trolley 17. The trolley conductor 16 may be energized from any suitable source of power, such as a generating station (not shown).

In accordance with a well known practice, the motors 10 and 11 are connected in series-circuit relation to start the vehicle. When it has been accelerated to a predetermined speed, the motors are connected in parallel circuit relation in order that the speed of the car may be increased further. Electrically-operated switches 18, 20 and 27 are provided for establishing the necessary circuits to connect the motors 10 and 11 in either series or parallel circuit relation.

A plurality of resistor sections 21, 22, 23 and 24 are provided to control the acceleration of the motors 10 and 11. Accelerating switches 19, 25, 26, 28 and 29 are disposed to shunt the resistor sections to accelerate the motors in a manner well known in the art.

In order that the acceleration of the motors may be automatically controlled, a current-limit relay 31, which is responsive to the motor current, is connected in the motor circuit. With a view to varying the rate of acceleration of the motors when traffic conditions change and to obtaining a higher rate of acceleration when operating conditions permit, the limit relay 31 is provided with a series or actuating coil 32 and a plurality of loading coils 33, 34 and 35, which are disposed to oppose the actuating coil 32. When the loading coils 33, 34 and 35 are energized, the amount of current required in the coil 32 to open the relay is increased thereby increasing the amount of current permitted to flow through the motors 10 and 11 during each step of acceleration and, consequently, increasing the rate of acceleration of the motors, as will be described more fully hereinafter.

The limit relay 31 cooperates with a sequence switch 36 to automatically control the operation of the transfer and accelerating switches 18 to 29, inclusive. The sequence switch is automatically advanced step-by-step to control the operation of the foregoing switches upon the actuation of a master controller 37 to set it in operation. As illustrated, the sequence switch comprises a plurality of contact fingers disposed to engage contact segments mounted upon a drum which is actuated by an air engine 38.

The operation of the air engine 38 is controlled by magnet valves 41 and 42 which are actuated by coils 43 and 44, respectively. The air engine 38 is so constructed that the drum of the sequence switch 36 is advanced when both of the magnet coils 43 and 44 are energized. When both of the coils 43 and 44 are deenergized, the drum of the sequence switch is actuated toward position "1". The drum of the sequence switch may be stopped and retained in any intermediate position by energizing the coil 43 and deenergizing the coil 44.

In order that the acceleration of the motors may be stopped at any time and the vehicle allowed to proceed at the speed previously attained, the master controller 37 is provided with a "lost motion" device which permits the operator to stop the sequence switch 36 at any time by a slight backward movement of the controller handle when the controller is in any position.

In previously known control systems, it has been necessary for the controller handle to be returned to a certain position to stop the sequence switch and it has been found that the operators frequently have difficulty in properly manipulating the controller to accomplish the desired results. By means of the present device, the operator may readily stop the acceleration of the vehicle at any time. A slight backward movement of the controller handle interrupts the circuit through the magnet coil 44 and stops the sequence switch, as will be explained more fully hereinafter.

The mechanical construction of the "lost motion" device provided on the controller is fully described in Patent No. 1,700,602, issued January 29, 1929 to L. J. Stephenson and assigned to the Westinghouse Electric & Manufacturing Company. It is, therefore, believed to be unnecessary to describe the details of its construction in this application.

The master controller 37, which may be of the drum type having a plurality of contact fingers disposed to engage contact segments, also controls the energization of the line switch 14 which connects the motors to the power conductor 15. When the controller is actuated to the "off" position, the motors are disconnected from the power source.

In order that smooth operation of the car may be obtained and a high degree of comfort afforded the passengers when power is shut off from the motors while the car is accelerating rapidly, provision is made for inserting resistance in the motor circuit before the motors are disconnected from the power source. The resistance is inserted after the master controller has been returned to the "off" position to disconnect the motors. In this manner, the motor speed is gradually reduced thereby preventing the uncomfortable jolt experienced by the passengers when power is shut off during a high rate of acceleration. In the embodiment of the invention illustrated, two resistor sections 45 and 46 are provided for this purpose, however, additional resistors may be provided if desired. Electrically-operated switches 47 and 48 are provided for shunting the resistors 45 and 46.

The energization of the actuating coils of the switches 47 and 48 is controlled by the master controller 37, but the switches are so interlocked with each other and with the line switch 14 that the line switch is closed first and then switches 47 and 48 in sequential relation. When the controller 37 is actuated to the "off" position, switch 48 is first opened and then switches 47 and 14 in sequential relation, thereby inserting the resistors 46 and 45 in the motor circuit before the motors are disconnected from the power source.

Assuming that it is desired to connect the motors 10 and 11 to the power conductor 15 to start the vehicle, the controller 37 is actuated to position "1" to establish an energizing circuit for the actuating coil of the line switch 14. This circuit may be traced from a conductor 51, which is connected to the power conductor 15, through contact fingers 52 and 53, bridged by a contact segment 54 on the controller 37, conductor 55 and the actuating coil of the switch 14 to a grounded conductor 56. At the same time a circuit is established for the actuating coil of the switch 18. This circuit extends from a contact finger 57, which engages the contact segment 54 on the controller 37, through conductors 58 and 59, an interlock 61 on the switch 20, conductor 62, an interlock 63 on the switch 18 to 19 and the actuating coil of the switch 18 to the grounded conductor 56. The closing of the switches 14 and 18 connects the motors 10 and 11 to the power source in series-circuit relation.

The motor circuit may be traced from the power conductor 15 through contact members 64 on the switch 14, the resistors 45 and 46, conductor 65, the armature of the motor 10, the field winding 12, conductor 66, the resistors 21 and 22, conductor 67, contact members 68 on the switch 18, conductors 69 and 71, the resistor 24, the conductor 72, the armature of the motor 11, the field winding 13, the actuating coil 32 of the limit relay 31 and conductor 74 to the grounded conductor 56.

It will be seen that the motors 10 and 11 are connected in series-circuit relation and that the resistors 45, 46, 24, 21 and 22 are connected in series with the motors thereby causing them to rotate at a relatively slow speed. The motors may be accelerated by actuating the controller 37 to position "2" thereby establishing a circuit for the actuating coil of the switch 47. This circuit may be traced from a contact finger 75, which engages the contact segment 54 of the controller 37, through conductors 76 and 77, an interlock 78 on the switch 14 and the actuating coil of the switch 47 to the grounded conductor 56. The closing of the contact members 79 on the switch 47 shunts the resistor 45 from the motor circuit.

When the switch 47 is closed, an energizing circuit is established for the actuating coil of the switch 48, which extends from a contact finger 81, which engages the contact segment 54, through conductor 82, contact fingers 83 and 84, bridged by the contact segment 85 on the sequence switch 36, conductor 86, an interlock 87 on the switch 47 and the actuating coil of the switch 48 to the grounded conductor 56. The resistor 46 is shunted by contact members 88 when the switch 48 is closed.

It will be seen that the air engine 38 is energized to operate the sequence switch 36 when the controller 37 is actuated to position "2". As previously explained, the air engine 38 will advance the sequence switch 36 when both of the magnet coils 43 and 44 are energized. The magnet coil 43 was energized when the controller 37 was actuated to position "1". The energizing circuit may be traced from a contact finger 91, which engages the contact segment 54, through conductors 92 and 93, the actuating coil 43 of the magnet valve 41 and conductor 94 to the grounded conductor 56.

When the controller 37 is actuated to position "2", the coil 44 of the magnet valve 42 is energized through a circuit which may be traced from the contact finger 81, through conductor 82, contact fingers 83 and 85, bridged by the contact segment 85, conductors 96 and 97, contact fingers 98 and 99, bridged by the contact segments 101, 102 and 103, which comprise the "lost motion" device previously described, conductor 104, contact members 105 on the limit relay 31, conductor 106, the actuating coil 44 of the magnet valve 42 and conductor 94 to the grounded conductor 56.

The sequence switch 36 is advanced step-by-step to operate the resistor shunting switches 25, 26, 28 and 19, as indicated in the sequence chart shown in Fig. 2.

When the sequence switch is advanced to position "4", the actuating coil of the switch 25 is energized through a circuit which extends from the energized conductor 81, through contact fingers 107 and 108, bridged by a contact segment 109, conductor 111 and the coil of the switch 25 to the grounded conductor 56. The resistor section 21 is shunted by the contact members 112 on the switch 25 when the switch is closed.

When the sequence switch 36 is advanced to position "5", an energizing circuit is established for the actuating coil of the switch 29, which may be traced from a contact finger 113, which engages the contact segment 109, through conductor 114 and the coil of the switch 29 to the grounded conductor 56. It will be seen that the closing of the contact members 115 of the switch 29 connects the resistors 23 and 24 in parallel circuit relation, thereby permitting an increase in the motor current and causing the motors to accelerate.

The advancement of the sequence switch to position "6" energizes the actuating coil of the switch 26 through a circuit which may be traced from a contact finger 116, through conductor 117 and the coil of the switch 26 to the grounded conductor 56. The resistor 22 is shunted by the closing of the contact members 118 of the switch 26.

When the sequence switch 36 advances to position "7", the switch 19 is closed to shunt the resistors 23 and 24 from the motor circuit, thereby accelerating the motors to the maximum speed which can be attained with the motors connected in series-circuit relation. The energizing circuit through the coil of the switch 19 may be traced from a contact finger 119, through conductor 121 and the actuating coil of the switch 19 to the grounded conductor 56.

As previously explained, the operation of the sequence switch 36 during the accelerating period is controlled by the limit relay 31. It will be readily understood that the current in the motor circuit increases when resistance is shunted from the motor circuit by the closing of the accelerating switches in the manner just described. When the motor current increases above a predetermined value, the limit relay 31 is opened or raised to its uppermost position by the force exerted by the actuating coil 32, which is connected in the motor circuit. The opening of the contact members 105, carried by the relay, interrupts the energizing circuit through the magnet coil 44 of the air engine 38, thereby stopping the advancement of the sequence switch 36, as previously explained. As the motors accelerate in speed their counter-electromotive force increases and the motor current is reduced, thereby permitting the limit relay 31 to drop to its lowermost position, which permits the sequence switch 36 to be advanced another step. In this manner, the sequence switch is permitted to advance step-by-step under the control of the limit relay 31 to accelerate the motors.

If it is desired to further increase the speed of the motors 10 and 11 by connecting them in parallel circuit relation, the controller 37 may be actuated to position "3" in which a contact finger 122 engages the contact segment 54, thereby keeping the conductor 97 energized and maintaining the circuit previously traced through the coil 44 of the magnet valve 42. The sequence switch 36, therefore, advances through the transition step to position "8", at which time the switch 19 is opened and the switches 27 and 20 are closed to connect the motors 10 and 11 to the power source in parallel-circuit relation. The energizing circuit for the actuating coil of the switch 27 may be traced from a contact finger 123 which engages the contact segment 109, through conductor 124, the coil of the switch 27, conductors 125 and 126 and an interlock 127 on the switch 18 to the grounded conductor 56. The circuit through the actuating coil of the switch 20 extends from a contact finger 128, through conductor 129, the coil of the switch 20, conductors 125 and 126 and the interlock 127 to the grounded conductor 56.

The motors 10 and 11 are now connected in parallel-circuit relation, the circuit through the motor 10 extending from the power conductor 15, through the contact members 64 of the switch 14, the contact members 88 of the switch 48, conductor 65, the armature winding of the motor 10, the field winding 12, conductor 66, the resistors 21 and 22, conductor 67, the contact members 131 on the switch 20 and conductor 74 to the grounded conductor 56. The circuit through the motor 11 may be traced from the conductor 65 through the contact members 132 on the switch 27, the resistors 23 and 24, conductor 72, the armature of the motor 11, the field winding 13, the coil 32 of the limit relay 31 and conductor 74 to the grounded conductor 56.

The motors 10 and 11 may be permitted to accelerate at a normal rate by permitting the sequence switch 36 to advance through positions "9" to "13", inclusive, to operate the accelerating switches 25, 26, 28 and 29 to shunt the resistors 21, 22, 23 and 24 in the manner previously described. The circuit through the actuating coil of the switch 28 may be traced from a contact finger 148, which engages the contact segment 109 on position "10" of the sequence switch 36, through conductor 149 and the coil of the switch 28 to the grounded conductor 56. The circuits through the actuating coils of the switches 25, 26 and 29 have been previously traced.

In order that a higher rate of acceleration may be obtained when traffic conditions permit, the limit relay 31, which, as previously explained, controls the operation of the sequence switch 36 and thereby controls the rate of acceleration of the motors, is provided with the loading coils 33, 34 and 35, which are disposed to oppose the actuating coil 32. The loading coil 33 is energized through a circuit which extends from the previously energized conductor 92, through contact fingers 133 and 134, bridged by contact segment 135, conductor 136, the coil 33 and a resistor 137 to the grounded conductor 56.

It will be observed that the controller 37 is provided with a contact segment 138, which is disposed to bridge contact fingers 141, 142, 143 and 144 to energize the loading coils 34 and 35. When the controller 37 is actuated to position "4", the loading coil 34 is energized through a circuit which extends from conductor 136, through the coil 34, conductor 145, contact fingers 142 and 141, bridged by the contact segment 138, conductor 146 and resistor 137 to the grounded conductor 56.

When the controller 37 is actuated to position "5", the loading coil 35 is energized through a circuit which may be traced from the conductor 136, through the coil 35, conductor 147, contact fingers 143 and 141, bridged by the contact segment 138, conductor 146 and the resistor 137 to the conductor 56. The three coils 33, 34 and 35 are thereby energized to oppose the actuating coil 32 and increase the amount of current required to operate the relay 31, which causes the motors 10 and 11 to be accelerated at a higher rate.

The rate of acceleration may be still further increased by actuating the controller 37 to position "6" to shunt the resistor 137 from the circuit through the loading coils 33, 34 and 35. When the controller 37 is on position "6", the contact finger 144 engages the contact segment 138 thereby connecting the coils 33, 34 and 35 directly to the grounded conductor 56, which increases the current flowing through the loading coils of the relay 31, thereby permitting a higher amount of current to flow through the motors 10 and 11.

In this manner, the operator of the vehicle can vary the rate of acceleration of the motors in accordance with traffic conditions. The highest rate of acceleration is obtained by actuating the controller 37 to position "6" and lower rates of acceleration may be obtained by retaining the drum 37 on one of the intermediate positions.

With a view to preventing the sequence switch 36 from stopping between positions when the circuit through the contact members 105 is interrupted by the operation of the limit relay 31, a plurality of contact segments 151 are disposed to be engaged by a contact finger 152, while the sequence switch is being actuated from one position to the next, thereby maintaining the energizing circuit through the coil 44 of the magnet valve 42. In this manner, it is insured that the sequence drum 36 will not stop between operating positions.

In order that the operator may stop the sequence switch 36 on any position to prevent the further acceleration of the car, the master controller 37 is provided with the "lost motion" device previously mentioned. It will be observed that the contact segment 103, which is actuated by the handle of the controller 37, is disposed to engage the contact segments 101 and 102 while the controller handle is being operated in a forward direction, thereby establishing the energizing circuit for the coil 44 of the magnet valve 42. By moving the handle of the controller a slight amount in the backward direction, the contact segment 103 will be disengaged from the contact segments 101 and 102 thereby interrupting the circuit through the coil 44 and stopping the sequence switch, as previously explained.

It will thus be seen that the operator can stop and hold the sequence switch on any position by a slight backward movement of the controller handle. This may be done irrespective of the position of the master controller and it is not necessary for the controller to be returned to a certain predetermined position, as has been required in previously known control systems, in order to stop the sequence switch.

When it is desired to resume the acceleration of the vehicle, it is only necessary for the operator to move the handle of the controller a slight amount in the forward direction to reestablish the energizing circuit for the coil 44 of the magnet valve 42, thereby permitting the sequence switch 36 to advance in the normal manner.

As is the usual practice, the motors may be disconnected from the power source to stop the car by returning the master controller 37 to the "off" position. However, in order to prevent the uncomfortable jolt which the passenger receives as a result of the sudden deceleration of the car when the power is suddenly shut off the motors while the car is traveling at a rapid rate, the resistors 45 and 46 are inserted in the motor circuit before the line switch 14 is permitted to open to completely disconnect the motors from the power source.

When the controller is actuated to the "off" position, the energizing circuit through the actuating coil of the switch 48 is interrupted, which permits this switch to open, thereby inserting the resistor 46 in the motor circuit. However, the switches 47 and 14 do not open when the controller 37 is returned to the "off" position. The switch 14 is retained in the closed position by a holding circuit which extends from a contact finger 153, which engages the contact segment 109 of the sequence switch 36, through conductor 154, an interlock 155 on the switch 47, conductor 55 and the coil of the switch 14 to the ground conductor 56. The holding circuit for the actuating coil of the switch 47 may be traced from conductor 55, which is energized through the circuit just traced, through conductor 156, an interlock 157 on the switch 48, conductor 77, the interlock 78 on the switch 14 and the coil of the switch 47 to the grounded conductor 56.

When the switch 48 opens, the holding circuit for the coil of the switch 47 is interrupted and this switch is then permitted to open, thereby inserting the resistor 45 in the motor circuit. Likewise, when the switch 47 opens, the holding circuit through the coil of the switch 14 is interrupted by the opening of the interlock 155 on the switch 47 and the switch 14 is then permitted to open to disconnect the motors from the power circuit. In this manner, the resistors 45 and 46 are inserted in the motor circuit for a short time in order to prevent the sudden decrease in the motor speed, thereby preventing the uncomfortable jolt experienced by the passengers on the vehicle when the power is suddenly shut off the motors.

In order to simplify the drawing and description of the control system, only two steps of resistance have been illustrated in connection with this feature, however, it will be understood that additional steps may be readily provided if desired. The switches which are provided for shunting the resistors may be interlocked with each other in a manner similar to that shown to insure that the switches will operate in the proper sequence.

From the foregoing description, it is evident that I have provided a control system which may be utilized for controlling the operation of electric motors of various types and which is especially suitable for controlling the propelling motors of electric vehicles. It is apparent that the system herein disclosed will permit smoother operation of the vehicle than previously known systems, thereby increasing the comfort of the passengers on the vehicle.

I do not desire to be restricted to the specific embodiment or arrangement of parts herein shown and described, since it is evident that they may be changed and modified without departing from the spirit and scope of my invention, as defined in the appended claims.

I claim as my invention:

1. In a motor-control system, in combination, a motor, a source of power for the motor, switching means for connecting the motor to the power source, a plurality of resistor sections connected in series-circuit relation and in series with the motor to control the motor current, a plurality of separately operable switches for shunting the resistor sections, means for automatically accelerating the motor, a controller for controlling the energization of said switching means and said resistor-shunting switches independently of the automatic accelerating means, and electrical interlocking means associated with said switches for preventing the motor from being disconnected from the power source while the resistor-shunting switches controlled by the controller are closed.

2. In a motor-control system, in combination, a motor, a source of power for the motor, switching means for connecting the motor to the power source, a plurality of resistor sections connected in series-circuit relation and in series with the motor to control the motor current, a plurality of separately operable switches for shunting the resistor sections, means for automatically accelerating the motor, a controller for controlling the energization of said switching means and said resistor-shunting switches independently of the automatic accelerating means, and electrical interlocking means associated with said switches and cooperating with the automatic accelerating means for causing the resistor-shunting switches controlled by the controller to be opened in a predetermined sequence before the motor can be disconnected from the power source.

3. In a motor-control system, in combination, a motor, a source of power for the motor, switching means for connecting the motor to the power source, a plurality of resistor sections connected in series-circuit relation and in series with the motor to control the motor current, a plurality of mechanically independent switches for shunting the resistor sections, means for automatically accelerating the motor, a controller for controlling the energization of said switching means and said resistor-shunting switches independently of the automatic accelerating means, and electrical interlocking means associated with said switching means and said resistor-shunting switches and cooperating with the automatic accelerating means for causing the resistor shunting switches controlled by the controller to be opened in a predetermined sequence before the switching means can be operated to disconnect the motor from the power source.

4. In a motor-control system, in combination, a motor, a source of power for the motor, switching means for connecting the motor to the power source, a controller for controlling the energization of said switching means, means for operating the controller, means for automatically controlling the acceleration of the motor, means for operating the acceleration-controlling means, and means associated with the controller to cause the acceleration-controlling means to be retained in any position by a slight movement of the controller operating means, the controller remaining stationary.

5. In a motor-control system, in combination, a motor, a source of power for the motor, switching means for connecting the motor to the power source, a manually-operable controller for controlling the energization of said switching means, means for automatically controlling the acceleration of the motor, means for operating the acceleration-controlling means, and means incorporated in the controller to cause the acceleration controlling means to be retained in any position by a slight backward movement of the controller handle only, the controller drum remaining stationary.

6. In a motor-control system, in combination, a motor, a source of power for the motor, switching means for connecting the motor to the power source, a drum controller for controlling the energization of said switching means, a sequence switch for automatically controlling the acceleration of the motor, means for operating the sequence switch, and means associated with said controller to cause the sequence switch to be retained in any position by a slight backward movement of the controller handle only, the controller drum remaining stationary.

7. In a motor-control system, in combination, a motor, a source of power for the motor, switching means for connecting the motor to the power source, a drum controller for controlling the energization of said switching means, a sequence switch for automatically controlling the acceleration of the motor, means for operating the sequence switch, and a lost motion device associated with the handle of said controller disposed to cause the sequence switch to be retained in any position by a slight backward movement of the controller handle only, the controller drum remaining stationary.

8. In a motor control system, in combination, a motor, a source of power for the motor, switching means for connecting the motor to the power source, a controller for controlling the energization of said switching means, a plurality of resistor sections to control the current supplied the motor, a plurality of accelerating switches for shunting the resistor sections, means for controlling the operation of the accelerating switches, a relay responsive to the current flowing in the motor for controlling the actuation of the accelerating switch controlling means, said relay having an actuating coil and a plurality of loading coils disposed to oppose the actuating coil, and means associated with the controller for successively energizing the loading coils to vary the current required to actuate the relay, whereby the rate of acceleration of the motor may be varied by advancing the controller.

9. In a motor-control system, in combination, a motor, a source of power for the motor, switching means for connecting the motor to the power source, a controller for controlling the energization of said switching means, a plurality of resistor sections to control the current supplied to the motor, a plurality of accelerating switches for shunting the resistor sections, means for controlling the operation of the accelerating switches, a relay responsive to the current flowing in the motor for controlling the actuation of the accelerating switch controlling means, said relay having an actuating coil and a plurality of loading coils disposed to oppose the actuating coil, means associated with the controller for successively energizing the loading coils to vary the current required to actuate the relay, a resistor for controlling the current in the loading coils and means on the controller for shunting said resistor, whereby the rate of acceleration of the motor may be varied by advancing the controller.

10. In a motor-control system, in combination, a motor, a source of power for the motor, switching means for connecting the motor to the power source, a plurality of resistor sections connected in series with the motor to control the motor current, a plurality of switches for shunting the resistor sections, a controller for controlling the energization of said switching means and said resistor-shunting switches, a sequence switch for automatically controlling the acceleration of the motor, electrical interlocking means associated with said switching means and said resistor-shunting switches for normally causing the resistor shunting switches to be opened in a predetermined sequence before the switching means operates to disconnect the motor from the power source, and means disposed on said sequence switch for ensuring the opening of said switching means in the event of failure of the electrical interlocking means to function properly.

NORMAN H. WILLBY.